United States Patent [19]

Hwang

[11] Patent Number: 5,781,249
[45] Date of Patent: Jul. 14, 1998

[54] FULL OR PARTIAL SEARCH BLOCK MATCHING DEPENDENT ON CANDIDATE VECTOR PREDICTION DISTORTION

[75] Inventor: Duck-Dong Hwang, Seoul, Rep. of Korea

[73] Assignee: Daewoo Electronics Co., Ltd., Seoul, Rep. of Korea

[21] Appl. No.: 743,785

[22] Filed: Nov. 7, 1996

[30] Foreign Application Priority Data

Nov. 8, 1995 [KR] Rep. of Korea ............. 95-40332

[51] Int. Cl.$^6$ ............................................. H04N 7/32
[52] U.S. Cl. ............................................. 348/699
[58] Field of Search .......................... 348/699, 416, 348/415, 409, 402, 401, 400, 390, 384; H04N 7/137

[56] References Cited

U.S. PATENT DOCUMENTS

| | | | |
|---|---|---|---|
| 5,428,403 | 6/1995 | Andrew et al. | 348/699 |
| 5,497,338 | 3/1996 | Miyake et al. | 348/699 |
| 5,583,580 | 12/1996 | Jung | 348/699 |

FOREIGN PATENT DOCUMENTS

| | | |
|---|---|---|
| 0 533 195 | 3/1993 | European Pat. Off. . |
| 0 624 981 | 11/1994 | European Pat. Off. . |

OTHER PUBLICATIONS

Chen and Pratt, "Scene Adaptive Coder", IEEE Transactions on Communications, vol. COM-32, No. 3, pp. 225-232, Mar. 1984.

Jain et al., "Displacement Measurement and Its Application in Interframe Image Coding", IEEE Transactions of Communications, vol. COM-29, No. 12, pp. 1799-1808, Dec. 1981.

*Primary Examiner*—Bryan Tung
*Attorney, Agent, or Firm*—Pennie & Edmonds LLP

[57] ABSTRACT

A motion vector detecting method determines a motion vector of a search block included in a search frame of a video signal by using motion vectors of processed neighboring blocks, wherein the search frame is divided into a multiplicity of blocks which include a set of processed blocks whose motion vectors have been determined, and the set of processed blocks contain the processed neighboring blocks which are neighboring blocks of the search block, by: (a) selecting an X-vector and an Y-vector among the motion vectors of the processed neighboring blocks, wherein the X-vector is a vector which is most similar to a horizontal vector the and the Y-vector is a vector which is most similar to a vertical vector, to thereby provide a group of candidate vectors which include the X-vector, the Y-vector and a 0 vector; (b) deciding a candidate motion vector among the group of candidate vectors; and (c) providing the candidate motion vector as the motion vector of the search block in case a distortion between the search block and a predicted block corresponding to the candidate motion vector is smaller than a predetermined threshold value and determining the motion vector of the search block by using a full search block matching method in case the distortion is not smaller than the predetermined threshold value.

20 Claims, 4 Drawing Sheets

FULL OR PARTIAL SEARCH BLOCK MATCHING DEPENDENT ON CANDIDATE VECTOR PREDICTION DISTORTION

FIELD OF THE INVENTION

The present invention relates to a method and an apparatus for detecting motion vectors; and, more particularly, to a method and an apparatus for determining a motion vector of a search block by using motion vectors of neighboring blocks of the search block.

DESCRIPTION OF THE PRIOR ART

As is well known, transmission of digitized video signals can deliver video images of a much higher quality than those delivered via the transmission of analog signals. When an image signal comprising a sequence of image "frames" is expressed in a digital form, a substantial amount of data is generated for transmission, especially in the case of a high definition television(HDTV) system. Since, however, the available frequency bandwidth of a conventional transmission channel is limited, in order to transmit the substantial amounts of digital data through the limited channel bandwidth, it is inevitable to compress or reduce the volume of the transmission data. Among various video compression techniques, the so-called hybrid coding technique, which combines temporal and spatial compression techniques together with a statistical coding technique, is known to be most effective.

Most hybrid coding techniques employ a motion compensated DPCM (differential pulse code modulation), two-dimensional DCT (discrete cosine transform), quantization of DCT coefficients, and VLC (variable length coding). The motion compensated DPCM is a process of determining the movement of an object between a current frame and a previous frame, and predicting the current frame according to the motion flow of the object to produce a differential signal representing the difference between the current frame and its prediction.

The two-dimensional DCT, which reduces or removes spatial redundancies between image data such as motion compensated DPCM data, converts a block of digital image data, for example, a block of 8×8 pixels, into a set of transform coefficient data. This technique is described in, e.g., Chen and Pratt, "Scene Adaptive Coder", *IEEE Transactions on Communications*, COM-32, No. 3, pp. 225–232 (March 1984). By processing such transform coefficient data with a quantizer, zigzag scanning, and VLC, the amount of data to be transmitted can be effectively compressed.

Specifically, in the motion compensated DPCM, current frame data is predicted from previous frame data based on an estimation of the motion between the current and the previous frames. Such estimated motion may be described in terms of two dimensional motion vectors representing the displacement of pixels between the previous and the current frames.

One of the methods which have been used most frequently in estimating the displacement of an object in a video sequence is the block matching algorithm. According to the block matching algorithm, a current frame is divided into a plurality of search blocks. The size of a search block typically ranges between 8×8 and 32×32 pixels. To determine a motion vector for a search block in the current frame, a similarity calculation is performed between the search block of the current frame and each of a plurality of equal-sized candidate blocks included in a generally larger search region within a previous frame. An error function such as the mean absolute error or mean square error is used to carry out a similarity measurement between the search block of the current frame and each of the candidate blocks in the search region. And a motion vector, by definition, represents the displacement between the search block and a candidate block which yields a minimum error function. Since the search block is compared with all possible candidate blocks within a search region corresponding to the search block (i.e., full search block matching), there occurs heavy computational requirement, which in turn exacts a complex hardware having the capability of very high speed processing and/or a large number of processors for real-time processing.

In light of the severe computational demands in a full search block matching procedure described above, simplified algorithms such as a three step search and a search for a minimum distortion have been proposed (see, e.g., J. R. Jain et al., "Displacement Measurement and Its Application in Interframe Image Coding", *IEEE Transactions of Communications* COM-29, No. 12, pp. 1799–1808 (December 1981)).

Although these simplified searching methods may reduce the computational burden and the hardware requirement, they still involve a considerable amount of computation.

Typically, a motion in a video sequence may be focalized upon an object with most of its background stationary or the motion may be simply translational, e.g., as in case of a camera panning. In such event, there may be found a number of motion vectors virtually with an identical value in a frame of the video sequence. Especially, a motion vector of a block may have a correlation with motion vectors of neighboring blocks, which can be utilized in reducing the computational burden required to determining the motion vectors.

SUMMARY OF THE INVENTION

It is, therefore, a primary object of the present invention to provide an apparatus for determining a motion vector of a search block by using motion vectors of neighboring blocks of the search block.

In accordance with the present invention, there is provided a method for determining a motion vector of a search block included in a search frame of a video signal by using motion vectors of processed neighboring blocks, wherein the search frame is divided into a multiplicity of blocks which include a set of processed blocks whose motion vectors have been determined, and the set of processed blocks contain the processed neighboring blocks which are neighboring blocks of the search block, the method comprising the steps of:

(a) selecting an X-vector and an Y-vector among the motion vectors of the processed neighboring blocks, wherein the X-vector is a vector which is most similar to a horizontal vector and the Y-vector is a vector which is most similar to a vertical vector, to thereby provide a group of candidate vectors which include the X-vector, the Y-vector and a 0 vector;

(b) deciding a candidate motion vector among the group of candidate vectors; and (c) providing the candidate motion vector as the motion vector of the search block in case a distortion between the search block and a predicted block corresponding to the candidate motion vector is smaller than a predetermined threshold value and determining the motion vector of the search block by using a full search block matching method in case the distortion is not smaller than the predetermined threshold value, wherein the predicted block corresponding to the candidate motion vector is a block of a reference frame displaced from the search block by the candidate motion vector.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
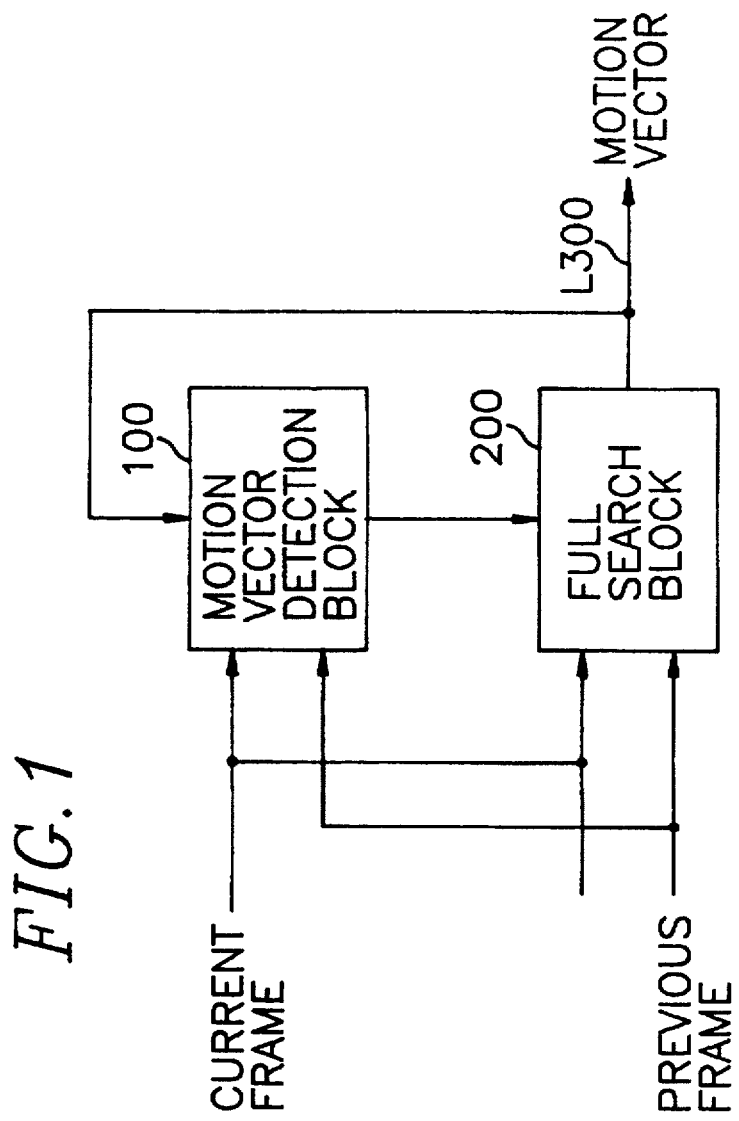
FIG. 1 shows a block diagram of the motion vector detecting apparatus of the present invention.

Referring to FIG. 1, there is shown a block diagram of a motion vector detecting apparatus of the present invention.

A current frame and a previous frame (in other words, a search frame and a reference frame) of a video signal are inputted to a motion vector detection block 100 and a full search block 200. At the motion vector detection block 100, to find a motion vector of a search block, i.e., a block currently being processed, motion vectors of processed neighboring blocks of the search block together with a 0 vector are examined to select a candidate motion vector, wherein processed blocks refers to blocks whose motion vectors are determined and the processed neighboring blocks are processed blocks neighboring the search block.

Figure 4:
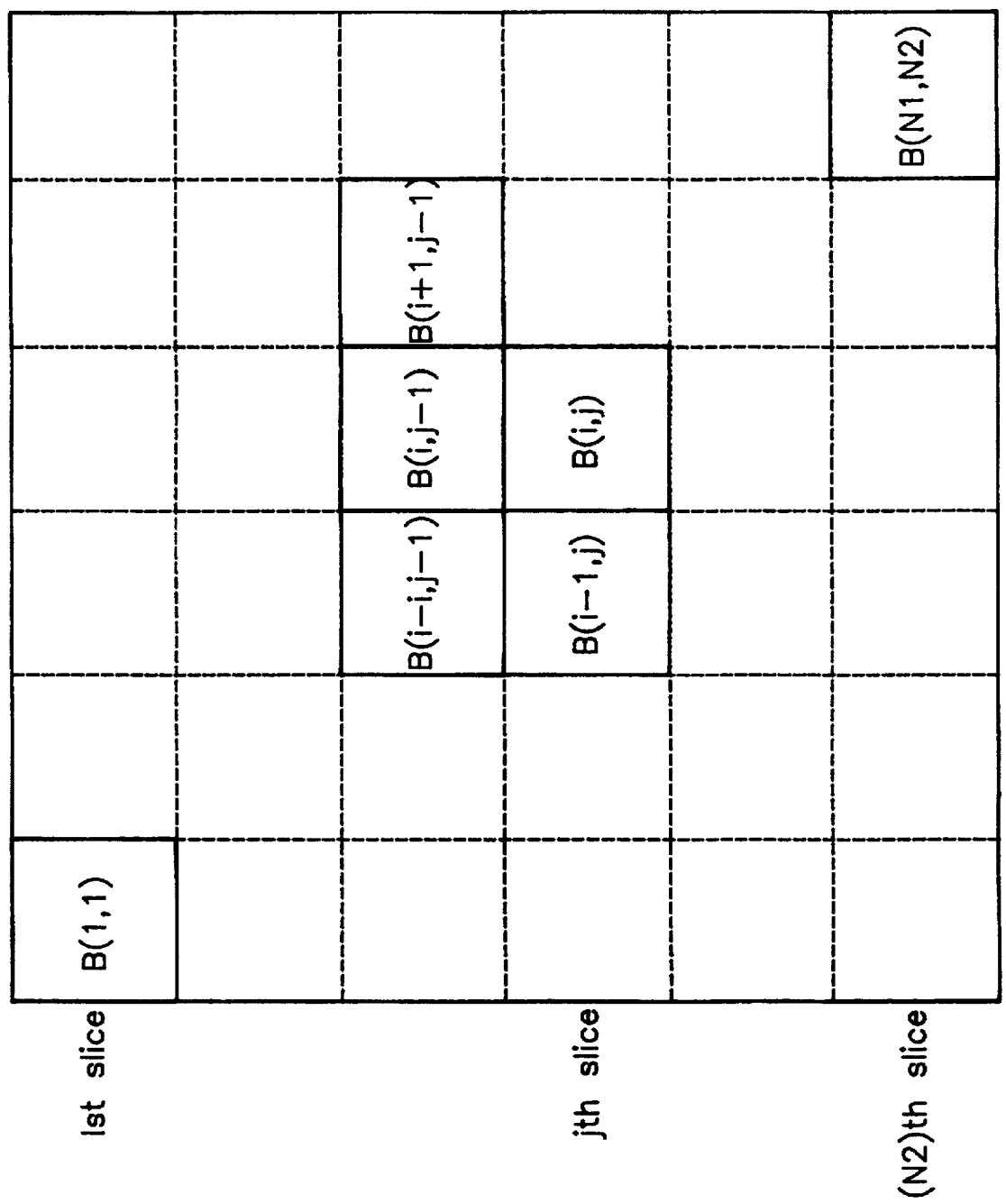
FIG. 4 illustrates neighboring blocks whose motion vectors are utilized in determining a motion vector of the search block.

The processed neighboring blocks whose motion vectors are utilized in detecting the motion vector of the search block B(i,j) are exemplified in FIG. 4. As shown in FIG. 4, the search frame consists of a multiplicity of slices, each of which includes a number of blocks, the number of slices and the number of blocks in each slice being N2 and N1, respectively. The search frame are processed from the upper left corner to the lower right corner. Therefore, among 8 neighboring blocks surrounding the search block B(i,j), motion vectors of 4 neighboring blocks, i.e., an upper left block B(i−1, j−1), an upper middle block B(i,j−1), an upper right block B(i+1,j−1), and a middle left block B(i−1,j), are known when the search block is processed, wherein j represents a slice number and i designates a location of a block in a slice, i and j being positive integers not larger than N1 and N2, respectively. It can be easily known that, if a search block is not located on the boundary of a frame, the number of processed neighboring blocks is 4. In case the search block is on the boundary as in the case of B(1,1), B(1,2) and so on, the number of processed neighboring blocks may be less than 4.

After the candidate motion vector is determined, a distortion between the search block and a predicted block corresponding to the candidate motion vector is compared with a predetermined threshold, wherein a predicted block corresponding to a vector is determined as a block of the reference frame which is displaced from the search block by the vector.

If the distortion between the search block and the predicted block corresponding to the candidate motion vector is smaller than the threshold, the candidate motion vector is decided as a motion vector of the search block and provided on a line L300 through the full search block 200. Otherwise, a full search trigger signal is applied to the full search block 200 which detects a motion vector of the search block by using a full search block matching method in response to the full search trigger signal. The full search block 200 provides either the motion vector provided from the motion vector detection block 100 or the motion vector determined therein. The motion vector provided from the full search block 200 is fed back to the motion vector detection block 100, to be used in detecting motion vectors of subsequent blocks, e.g., B(i+1,j), of the current frame.

In the present invention, the motion vector of the search block is either selected among the motion vectors of the processed neighboring blocks or decided by using the full search block matching. Therefore, the amount of computation is reduced compared to a motion estimator using only the full search block matching. Especially, the reduction is more prominent for a video signal wherein moving objects occupy a small portion thereof, because neighboring blocks are likely to yield similar motion vectors.

In case processed neighboring blocks of a search block are less than 4 blocks, as in the case of B(1,1), B(1,2), B(1,3), B(2,1), B(3,1) and so on, the operation of the motion vector detection block 100 may be disabled and the motion vector of the search block may be determined by using the full search block matching method. Alternatively, if at least one processed neighboring block exists, for example, in the case of the search blocks B(1,2), B(1,3), B(2,1), B(3,1) and so on, the motion vector detection block 100 may operate in a similar manner to the cases of 4 processed neighboring blocks.

Figure 2:
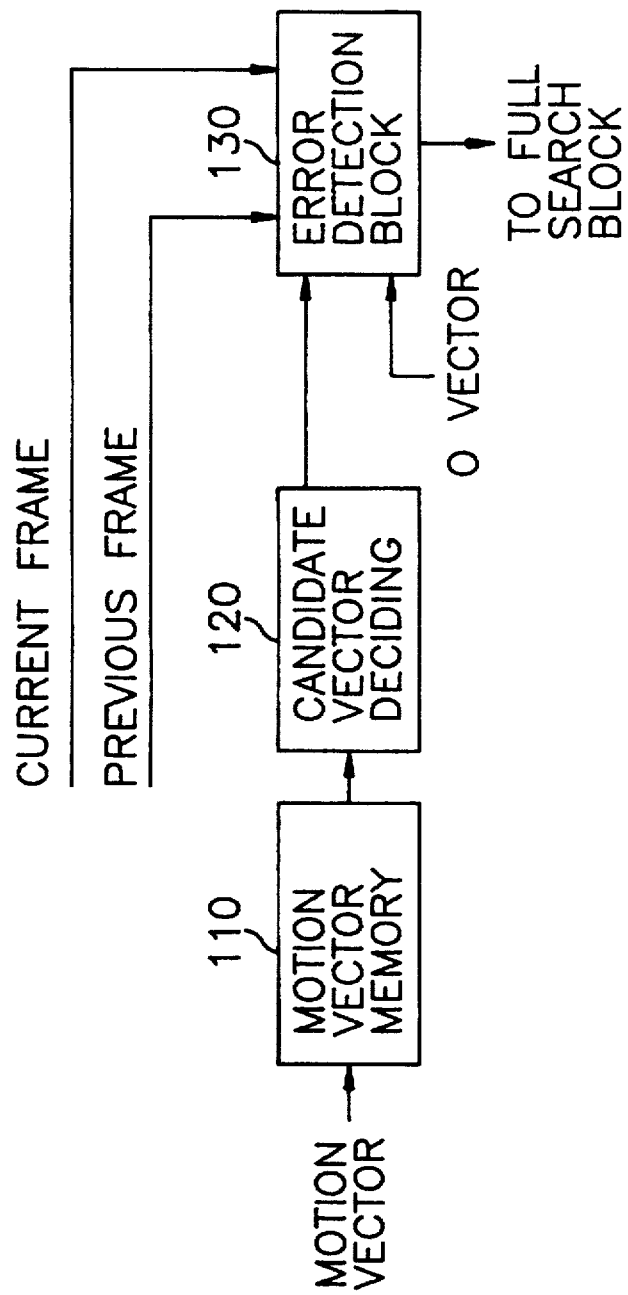
FIG. 2 provides a detailed block diagram of a motion vector detection block shown in FIG. 1.

Referring to FIG. 2, there is provided a detailed block diagram of the motion vector detection block 100 shown in FIG. 1. The motion vectors of the processed blocks are fed to a motion vector memory 110, to be stored therein. Among them, neighboring vectors which refer to motion vectors of the processed neighboring blocks are selected and coupled to a candidate vector deciding block 120.

Referring again to FIG. 4, when the search block B(i,j) is being processed, at least motion vectors of the blocks B(i−1, j−1) to B(N1, j−1) and B(1,j) to B(i−1,j) should be stored at the motion vector memory 110. (Note that B(i, j−1) to B(N1, j−1) are necessary in determining motion vector of remaining blocks, i.e., B(i+1, j) to B(N1, j) included in a jth slice; and B(1, j) to B(i−1, j) are used in determining motion vectors of blocks included in a (j+1)st slice.) Therefore, the motion vector memory 110 should at least have (N1+1) memory spaces each of which can accommodate a motion vector of a processed block.

At the candidate vector deciding block 120, an X-vector and an Y-vector are selected among the neighboring vectors, wherein the X-vector refers to a neighboring vector which is most similar to a horizontal vector and the Y-vector refers to a neighboring vector which is most similar to a vertical vector, the horizontal and the vertical vectors referring to vectors whose y component and x component are 0, respectively.

To do this, a directivity D(V) of a vector V may be defined as the following:

$$D(V) = \frac{abs[V_y]}{abs[V_x]} \qquad \text{Eq. (1)}$$

wherein $V_x$ and $V_y$ are X and Y components of V, respectively. A motion vector with a minimum directivity is most similar to the horizontal vector and is selected as the X-vector and a motion vector with a maximum directivity is most similar to the vertical vector and is selected as the Y-vector. In case there exists a motion vector whose x component $V_x$ is 0, Eq. (1) is not defined. In this case, the motion vector is the vertical vector, and therefore, is determined as the Y-vector.

A set of three candidate vectors, the set including the X-vector and the Y-vector provided from the candidate vector deciding block 120 and a 0 vector are fed to an error detection block 130.

Referring to FIG. 4, in case the number of processed neighboring blocks is 1, (for example, a search block B(2,1)) the motion vector of the processed neighboring block (B(1, 1)) may be decided as both of the X and the Y vectors.

At the error detection block 130, a distortion between the search block and each of three predicted blocks corresponding to the three candidate vectors inputted thereto is determined, wherein the distortion is a value which represents a difference between two blocks. Of the three candidate vectors, one with a minimum distortion is selected as the candidate motion vector. If the minimum distortion of the candidate motion vector is smaller than the threshold TH, the candidate motion vector is determined as the final motion vector of the search block. Accordingly, a procedure for detecting a motion vector of the search block is completed and the motion vector is provided on L300 through the full search block 200.

If the minimum distortion is not smaller than the threshold TH, the full search trigger signal is applied from the error detection block 130 to the full search block 200, which detects a motion vector of the search block by using the full search block matching method.

Figure 3:
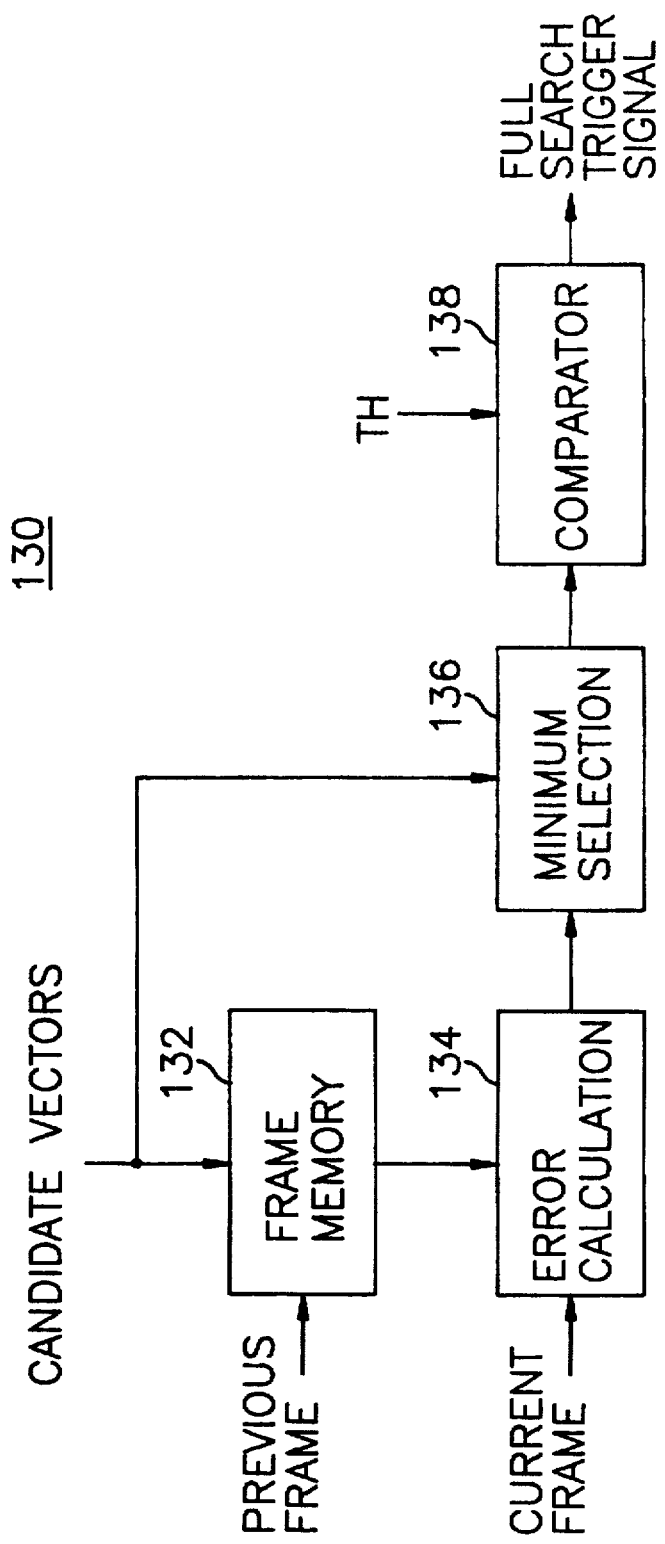
FIG. 3 depicts a more detailed block diagram of an error detection block shown in FIG. 2.

Referring to FIG. 3, there is shown a more detailed block diagram of the error detection block 130 shown in FIG. 2.

The previous frame is coupled to a frame memory 132 which provides the three predicted blocks which are blocks of the previous frame displaced from the search block by the X-vector, the Y-vector and the 0 vector, respectively, in response to the three candidate vectors provided from the candidate vector deciding block 120. The three predicted blocks are fed to an error calculator 134 which calculates a distortion between the search block and each of the three predicted blocks. At a minimum selection block 136, a candidate vector which corresponds to a minimum distortion is selected as the candidate motion vector. The candidate motion vector and the minimum distortion are fed to a comparator 138.

At the comparator 138, the minimum distortion is compared with the predetermined threshold TH. If the minimum distortion is smaller than TH, the candidate motion vector is provided as the motion vector of the search block; and otherwise, the full search trigger signal is applied to the full search block 200.

As described above, in case moving objects occupy a small portion of the video signal, motion vectors of neighboring blocks are likely to be similar. In addition, if the background is stationary or is moving mainly in a horizontal or a vertical direction, motion vectors are likely to be similar to the 0 vector, the horizontal vector or the vertical vector. Therefore, in this situation, the candidate motion vector is likely to be determined as the motion vector of the search block, to thereby reduce the computational burden entailed in determining the motion vector by using the conventional method.

While the present invention has been described with respect to the particular embodiments, it will be apparent to those skilled in the art that various changes and modifications may be made without departing from the spirit and scope of the invention as defined in the following claims.

What is claimed is:

1. A method for determining a motion vector of a search block included in a search frame of a video signal by using motion vectors of processed neighboring blocks, wherein the search frame is divided into a multiplicity of blocks which include a set of processed blocks whose motion vectors have been determined, and the set of processed blocks contain the processed neighboring blocks which are the blocks neighboring the search block, the method comprising the steps of:

(a) selecting an X-vector and a Y-vector among the motion vectors of the processed neighboring blocks, wherein the X-vector is a vector which is most similar to a horizontal vector and the Y-vector is a vector which is most similar to a vertical vector, the horizontal and the vertical vectors referring to vectors whose y component and x component are 0's, respectively, to thereby provide a group of candidate vectors which include the X-vector, the Y-vector and a 0 vector;

(b) deciding a candidate motion vector among the group of candidate vectors; and (c) providing the candidate motion vector as the motion vector of the search block in case a distortion between the search block and a predicted block corresponding to the candidate motion vector is smaller than a predetermined threshold value, and determining the motion vector of the search block by using a full search block matching method in case the distortion is not smaller than the predetermined threshold value, wherein the predicted block corresponding to the candidate motion vector is a block of a reference frame displaced from the search block by the candidate motion vector.

2. The method of claim 1, wherein said step (b) includes the steps of:

(b1) calculating a distortion between the search block and each of predicted blocks corresponding to the candidate vectors; and (b2) designating a candidate vector yielding a smallest distortion as the candidate motion vector.

3. The method of claim 1, wherein the processed neighboring blocks of the search block include an upper left, an upper middle, an upper right, and a middle left blocks surrounding the search block.

4. An apparatus for determining a motion vector of a search block included in a search frame of a video signal by using motion vectors of processed neighboring blocks, wherein the search frame is divided into a multiplicity of blocks which include a set of processed blocks whose motion vectors have been determined and the set of processed blocks contain the processed neighboring blocks which are the blocks neighboring the search block, the apparatus comprising:

first selection means for selecting a candidate motion vector among the motion vectors of the processed neighboring blocks and a 0 vector;

means for providing the candidate motion vector as the motion vector of the search block in case a distortion between the search block and a predicted block corresponding to the candidate motion vector is smaller than a predetermined threshold value, and providing a full search trigger signal in case the distortion is not smaller than the predetermined threshold value, wherein the predicted block corresponding to the candidate motion vector is a block included in a reference frame of the video signal displaced from the search block by the candidate motion vector; and means for determining the motion vector of the search block by using a full search block matching in response to the full search trigger signal, wherein the first selection means includes:

storage means for storing the motion vectors of the processed blocks;

means for choosing the motion vectors of the processed neighboring blocks among the motion vectors stored at the storage means, to thereby provide neighboring vectors;

second selection means for selecting an X-vector and a Y-vector among the neighboring vectors, wherein the X-vector is a vector which is most similar to a horizontal vector among the neighboring vectors and the Y-vector is a vector which is most similar to a vertical vector among the neighboring vectors, the horizontal and the vertical vectors referring to vectors whose y component and x component are 0's, respectively, to thereby provide candidate vectors which include the X-vector, the Y-vector and the 0 vector; and third selection means for selecting the candidate motion vector among the candidate vectors.

5. The apparatus of claim 4, wherein the search frame is divided into a multiplicity of slices each of which includes N search blocks, N being a positive integer, and the storage means is composed of (N+1) memory spaces each of which accommodates a motion vector of a processed block.

6. The apparatus of claim 4, wherein the processed neighboring blocks of the search block include an upper left, an upper middle, an upper right, and a middle left blocks surrounding the search block.

7. The apparatus of claim 4, wherein the third selection means is composed of:

means for providing predicted blocks corresponding to the candidate vectors;

means for calculating a distortion between the search block and each of the predicted blocks corresponding to the candidate vectors; and means for designating a candidate vector yielding a smallest distortion as the candidate motion vector.

8. An apparatus for determining a motion vector of a search block included in a search frame of a video signal by using motion vectors of processed neighboring blocks, wherein the search frame is divided into a multiplicity of blocks which include a set of processed blocks whose motion vectors have been determined and the set of processed blocks contain the processed neighboring blocks which are the blocks neighboring the search block, the apparatus comprising:

first selection means for selecting a candidate motion vector among the motion vectors of the processed neighboring blocks and a 0 vector;

means for providing the candidate motion vector as the motion vector of the search block in case a distortion between the search block and a predicted block corresponding to the candidate motion vector is smaller than a predetermined threshold value, and providing a full search trigger signal in case the distortion is not smaller than the predetermined threshold value, wherein the predicted block corresponding to the candidate motion vector is a block included in a reference frame of the video signal displaced from the search block by the candidate motion vector; and means for determining the motion vector of the search block by using a full search block matching in response to the full search trigger signal, wherein the first selection means includes:

means for choosing motion vectors of the processed neighboring blocks among the motion vectors of the processed blocks, to thereby provide neighboring vectors;

second selection means for selecting an X-vector and a Y-vector among the neighboring vectors, wherein the X-vector is a vector which is most similar to a horizontal vector among the neighboring vectors and the Y-vector is a vector which is most similar to a vertical vector among the neighboring vectors, the horizontal and the vertical vectors referring to vectors whose y component and x component are 0's, respectively, to thereby provide candidate vectors which include the X-vector, the Y-vector and the 0 vector; and third selection means for selecting the candidate motion vector among the candidate vectors.

9. The apparatus of claim 8, wherein the third selection means is composed of:

means for providing predicted blocks corresponding to the candidate vectors;

means for calculating a distortion between the search block and each of the predicted blocks corresponding to the candidate vectors; and means for designating a candidate vector yielding a smallest distortion as the candidate motion vector.

10. The apparatus of claim 8, wherein the search frame is divided into a multiplicity of slices each of which includes N search blocks, N being a positive integer, and the storage means is composed of (N+1) memory spaces each of which accommodates a motion vector of a processed block.

11. The apparatus of claim 8, wherein the processed neighboring blocks of the search block include an upper left, an upper middle, an upper right, and a middle left blocks surrounding the search block.

12. An apparatus for determining a motion vector of a search block included in a search frame of a video signal by using motion vectors of processed neighboring blocks, wherein the search frame is divided into a multiplicity of blocks which include a set of processed blocks whose motion vectors have been determined and the set of processed blocks contain the processed neighboring blocks which are the blocks neighboring the search block, the apparatus comprising:

selection means for selecting a candidate motion vector among the motion vectors of the processed neighboring blocks, which include an X-vector and a Y-vector, and a 0 vector, wherein the X-vector is a vector which is most similar to a horizontal vector and the Y-vector is a vector which is most similar to a vertical vector, the horizontal and the vertical vectors referring to vectors whose y component and x component are 0's, respectively;

means for providing the candidate motion vector as the motion vector of the search block in case a distortion between the search block and a predicted block corresponding to the candidate motion vector is smaller than a predetermined threshold value, and providing a full search trigger signal in case the distortion is not smaller than the predetermined threshold value, wherein the predicted block corresponding to the candidate motion vector is a block included in a reference frame of the video signal displaced from the search block by the candidate motion vector; and means for determining the motion vector of the search block by using a full search block matching in response to the full search trigger signal.

13. The apparatus of claim 12, wherein the selection means includes:

storage means for storing the motion vectors of the processed blocks;

means for choosing the motion vectors of the processed neighboring blocks among the motion vectors stored at the storage means, to thereby provide neighboring vectors;

means for selecting the X-vector and the Y-vector among the neighboring vectors, to thereby provide candidate vectors which include the X-vector, the Y-vector and the 0 vector; and means for choosing the candidate motion vector among the candidate vectors.

14. The apparatus for claim 13, wherein the search frame is divided into a multiplicity of slices each of which includes N search blocks, N being a positive integer, and the storage means is composed of (N+1) memory spaces each of which accommodates a motion vector of a processed block.

15. The apparatus of claim 13, wherein the processed neighboring blocks of the search block include an upper left, an upper middle, an upper right, and a middle left blocks surrounding the search block.

16. The apparatus of claim 13, wherein the choosing means is composed of:

means for providing predicted blocks corresponding to the candidate vectors;

means for calculating a distortion between the search block and each of the predicted blocks corresponding to the candidate vectors; and means for designating a candidate vector yielding a smallest distortion as the candidate motion vector.

17. The apparatus of claim 12, wherein the selection means includes:

means for choosing the motion vectors of the processed neighboring blocks among the motion vectors of the processed blocks, to thereby provide neighboring vectors;

means for selecting the X-vector and the Y-vector among the neighboring vectors, to thereby provide candidate vectors which include the X-vector, the Y-vector and the 0 vector; and means for choosing the candidate motion vector among the candidate vectors.

18. The apparatus for claim 17, wherein the search frame is divided into a multiplicity of slices each of which includes N search blocks, N being a positive integer, and the storage means is composed of (N+1) memory spaces each of which accommodates a motion vector of a processed block.

19. The apparatus of claim 17, wherein the processed neighboring blocks of the search block include an upper left, an upper middle, an upper right, and a middle left blocks surrounding the search block.

20. The apparatus of claim 17, wherein the choosing means is composed of:

means for providing predicted blocks corresponding to the candidate vectors;

means for calculating a distortion between the search block and each of the predicted blocks corresponding to the candidate vectors; and means for designating a candidate vector yielding a smallest distortion as the candidate motion vector.

* * * * *